(12) United States Patent
Worton et al.

(10) Patent No.: US 7,506,579 B2
(45) Date of Patent: Mar. 24, 2009

(54) HEATING RACK

(76) Inventors: Ian Geoffrey Worton, 795 Sutton Road, Aldridge, Walsall (GB) WS9 9RB; Peter Karl Neath, 98, Birminhan Road, Aldridge, Walsall (GB) ES9 oAZ ( * ) Notice: Subject to any disclaimer, the term of this patent is extended or adjusted under 35 U.S.C. 154(b) by 674 days.

(21) Appl. No.: 10/534,030

(22) PCT Filed: Nov. 6, 2003

(86) PCT No.: PCT/GB03/04807

§ 371 (c)(1),
(2), (4) Date: May 6, 2005

(87) PCT Pub. No.: WO2004/041041

PCT Pub. Date: May 21, 2004

(65) Prior Publication Data

US 2006/0102014 A1    May 18, 2006

(30) Foreign Application Priority Data

Nov. 6, 2002    (GB) ................................ 0225906.7

(51) Int. Cl.
*A47J 37/06* (2006.01)
(52) U.S. Cl. ............................. 99/446; 99/445; 99/450
(58) Field of Classification Search .................... 99/446
See application file for complete search history.

(56) References Cited

U.S. PATENT DOCUMENTS

| | | | | |
|---|---|---|---|---|
| 472,537 A | * | 4/1892 | Griswold et al. ............... | 99/445 |
| 1,510,547 A | * | 10/1924 | Ferrari ......................... | 99/445 |
| 2,060,004 A | * | 11/1936 | Ebberts ........................ | 99/446 |
| 2,117,749 A | * | 5/1938 | Studer .......................... | 99/446 |
| 3,130,662 A | * | 4/1964 | Robinson ..................... | 99/352 |
| 3,186,331 A | * | 6/1965 | Dettling ........................ | 99/445 |
| 3,308,747 A | * | 3/1967 | Spagnolo ..................... | 99/400 |
| 3,369,481 A | * | 2/1968 | Pappas ......................... | 99/445 |
| 3,552,301 A | * | 1/1971 | McNeff ........................ | 99/445 |
| 4,598,634 A | * | 7/1986 | Van Horn, II ................ | 99/340 |
| 4,606,261 A | * | 8/1986 | Bernardi ...................... | 99/445 |
| 4,936,202 A | * | 6/1990 | Lin ............................... | 99/446 |
| 5,076,154 A | * | 12/1991 | Bagwell ....................... | 99/446 |

(Continued)

FOREIGN PATENT DOCUMENTS

DE    2949107 A    *    6/1981

(Continued)

*Primary Examiner*—Joseph M Pelham
(74) *Attorney, Agent, or Firm*—Young & Thompson

(57) ABSTRACT

A heating rack comprising a plurality of spaced discrete elongate members (26) which an object (16) to be heated is placed and exposed to a source of heat. Each member (26) having a main body (28) with two side faces (30) that, in use, extend in a vertical direction and along the member (26), and a side member (32) located at the lowermost extremity of each side face (30). Each side member is shaped, positioned, and arranged, relative to its respective side face (30) so that, in use, liquid from the object (16) when it is heated is induced to run down each side face (30) due to surface tension effects and is collected by each side member (32) and directed in a direction along each side member (32) to a collection region at one or both ends of the members (26).

18 Claims, 8 Drawing Sheets

U.S. PATENT DOCUMENTS

| | | | | |
|---|---|---|---|---|
| 5,105,725 | A | * | 4/1992 | Haglund .................... 99/446 |
| 5,259,299 | A | * | 11/1993 | Ferraro .................... 99/340 |
| 5,347,978 | A | * | 9/1994 | Zuran ..................... 126/41 R |
| 5,437,221 | A | * | 8/1995 | Schwod .................... 99/449 |
| 5,445,066 | A | * | 8/1995 | Rosset .................... 99/446 |
| 5,467,691 | A | * | 11/1995 | Koziol .................... 99/340 |
| 5,911,812 | A | * | 6/1999 | Stanek et al. ............. 99/446 |
| 5,974,954 | A | * | 11/1999 | Rigney et al. ............. 99/396 |
| 6,363,842 | B1 | * | 4/2002 | Lin ........................ 99/425 |
| 6,481,343 | B1 | * | 11/2002 | Rigney et al. ............. 99/396 |

FOREIGN PATENT DOCUMENTS

| | | |
|---|---|---|
| DE | 92 05 270 | 7/1992 |
| DE | 196 33 296 | 2/1998 |
| DE | 197 24 035 | 12/1998 |
| WO | WO 80 00654 | 4/1980 |

* cited by examiner

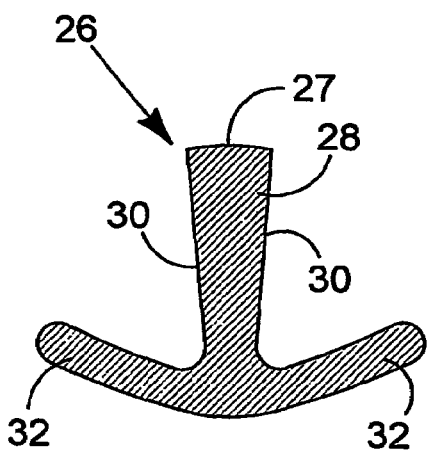
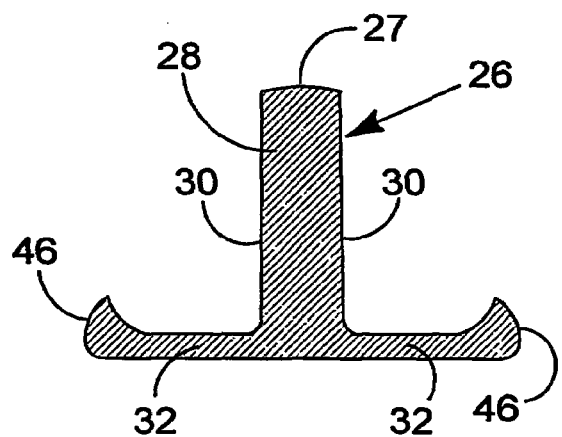
FIGURE 7           FIGURE 8
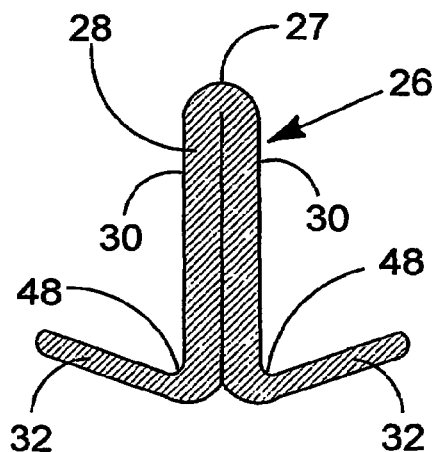
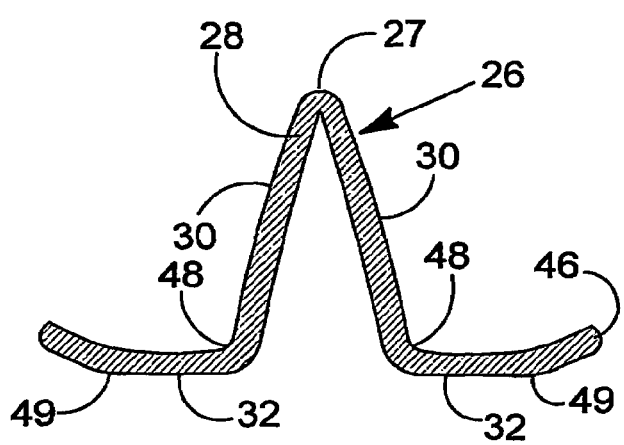
FIGURE 9           FIGURE 10
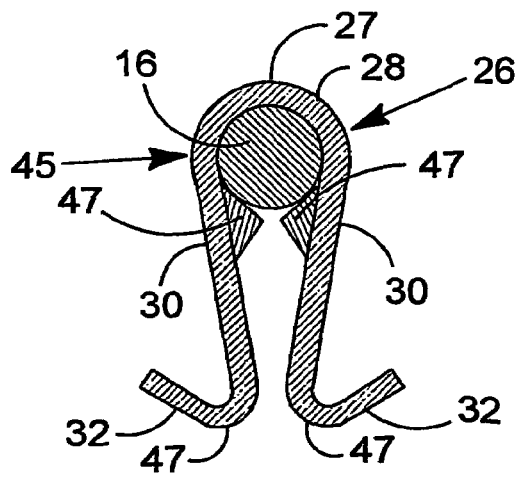
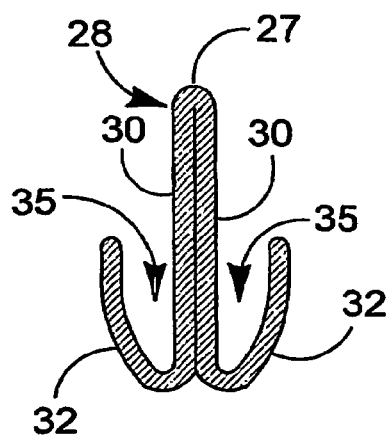
FIGURE 11          FIGURE 12

HEATING RACK

BACKGROUND OF THE INVENTION

1. Field of the Invention

This invention relates to heating racks and in particular, although not exclusively to heating racks for heating and cooking food. The invention has particular relevance to the cooking of fatty foods over naked flames such as barbecues.

2. Description of the Related Art

It is to be understood that the present invention may be applied in cooking ovens or in grills and industrial ovens. Where the context permits, the present invention may be used in the heating of other objects where heating the object results in the melting of the object.

One of the main problems with cooking fatty foods such as sausages, meat, kebabs, beef burgers and the like over charcoal or gas heated synthetic charcoal or coals, is that the fat runs down and drips into the heated coals and ignites. This causes flames to rise and overcook or burn the food being cooked.

Often the resulting flare-up causes personal danger to the user and many a user of barbecues have barbecued more than they bargained for!

There have been a number of attempts, some very complex solutions, to prevent the fat from igniting. For example in U.S. Pat. No. 5,105,725, there is shown a grill having a grid element. The grid element comprises a base element and upstanding ribs. Openings are provided.

One problem associated with the prior art is that those solutions have resulted in a reduction of direct heat radiation from the heat source, which is undesirable because it reduces the cooking efficiency.

BRIEF SUMMARY OF THE INVENTION

An object of the present invention is to provide a heating rack suitable for use in barbecues, on open fires, in cooking ovens or in heating furnaces that reduces the risk of molten liquids dropping on to hot surfaces or heating surfaces.

A particular object with regards to cooking of foods over hot charcoal, coals, synthetic coals and ceramics, or naked flames is to reduce the risk of juices and melted fats from dropping on to the heat source and thereby causing flare ups or increased smoke whilst at the same time exposing more of the food to direct radiated or convected heat from the heat source.

According to one aspect of the present invention, there is provided a heating rack comprising a plurality of elongate members, each elongate member having a contact surface on which an object to be heated is placed to be exposed to a heat source and a first lateral portion shaped to form a channel disposed below the contact surface for receiving and directing exudate from the object to a collection region at one or both ends of the channel. Each elongate member is spaced from an adjacent elongate member to expose the object directly to the heat source when placed at any position along the contact surface.

Beneficially, the vertical heat radiation is optimised, thereby to improve cooking efficiency.

Optionally, each elongate member is spaced from an adjacent elongate member by a distance in the range of 5 mm to around 15 mm, thereby to induce flow of exudates by surface tension effect. In some embodiments the vertical distance between the contact surface and the proximal end of the lateral portion is about 1 mm or more, thereby to encourage flow of exudates into the channel by a surface tension effect.

Preferably, each elongate member has a side face extending between the contact surface and the first lateral portion to encourage exudate from the object to flow from the contact surface to the channel positioned on one side of the contact surface. More preferably, each elongate member has a second side face extending between the contact surface and a second lateral portion to form a second channel on the other side of the contact surface. The lateral portions may be inclined along their length so that liquid collected by the channels is directed along the side members to a collection region at one or both ends of the side members. In some embodiments, the lateral portions are inclined in two directions along their length.

In one class of embodiments, the elongate members are inclined along their length so that the liquid collected by the channels is directed in a direction along the channels to a collection region at one or both ends of the main members.

The elongate members may be inclined in two directions along their length. Alternatively, the elongate members may be curved along their length being higher at a mid-span region than at their ends.

According to an optional feature of this aspect of the invention, the elongate members are formed from a sheet of metal that is folded to define the main body with two side faces and the side members.

The elongate members may be of substantially inverted "T" shape cross-section, or "anchor" shape in cross-section.

According to another optional feature, the elongate members are mounted on support rods. Preferably, the support rods define a frame with rods extending across the frame transverse to the members.

Each elongate member may comprise a sheet of metal that is folded into a shape that fits over a rod and defines the or each lateral portion and the contact surface.

A second aspect of the invention is provided by a heating rack comprising a plurality of spaced discrete elongate members having a contact surface on which an object to be heated is placed and exposed to a heat source and a lateral portion for forming a channel disposed below the contact surface for receiving exudate from the object, wherein the channel is inclined along its length to direct the exudate to a collection region at one end of the channel. The elongate members may be curved along their length being higher at a mid-span region than at their ends.

BRIEF DESCRIPTION OF THE DRAWING FIGURES

Exemplary embodiments of the present invention will now be described, by way of an example only, with reference to the accompanying drawings, in which:

FIGS. 7 to 12 show alternative cross-sectional shapes of rack members constructed in accordance with the present invention.

DETAILED DESCRIPTION OF THE PREFFERED EMBODIMENT

Figure 1:
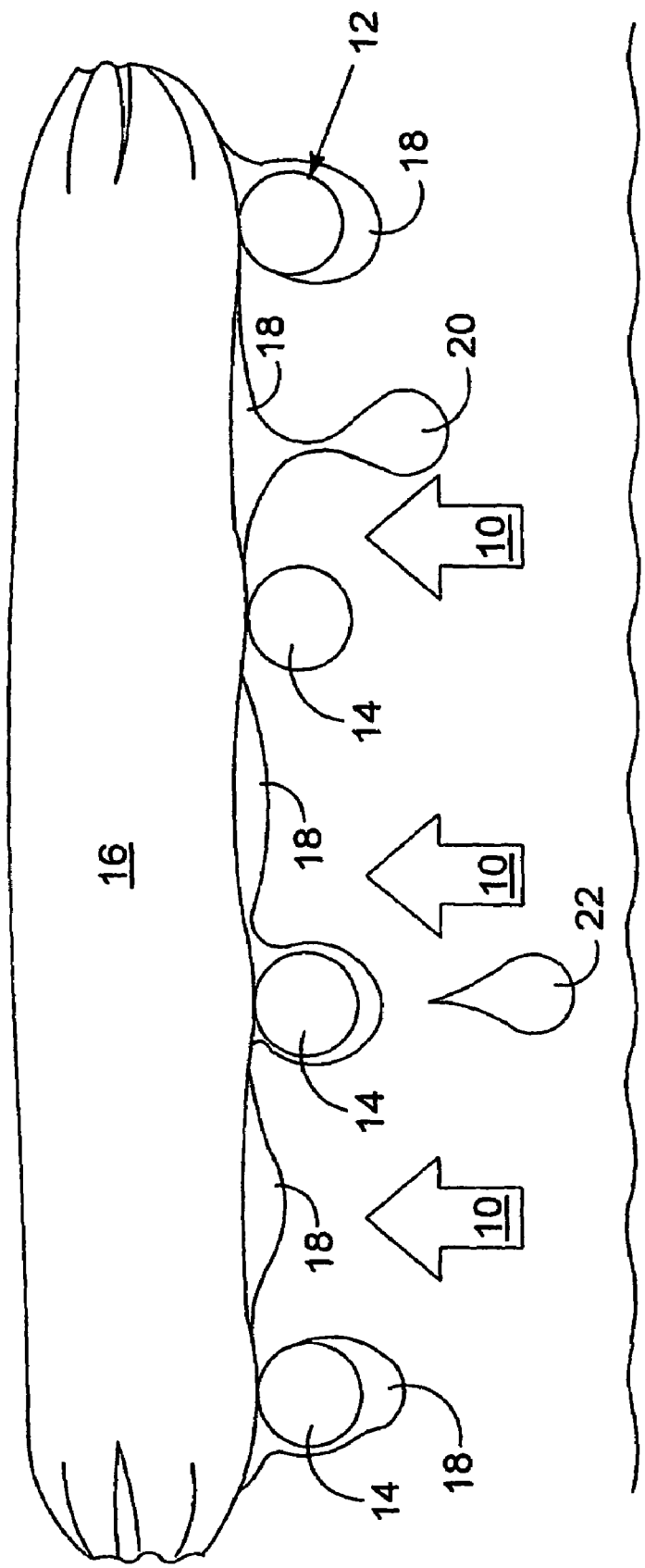
FIG. 1 shows schematically a cross-sectional view of a prior known barbecue using a known design of heating rack.

Referring to FIG. 1 a known barbecue comprises a source of heat 10 which may be a naked flame, hot glowing charcoal, coke or coal, or synthetic heated "coals" made of ceramics, cement, or porous volcanic rocks heated by gas flames. A rack 12 is positioned above the heat source 10 on which food to be cooked is placed. The rack 12 comprises a plurality of rack members in the form of spaced elongate bars 14 of circular cross-sectional shape. Conventionally the bars 14 are welded to a supporting frame (not shown) that extend transverse to the lengths of the bars 14.

FIG. 1 shows a sausage 16 that is heated by the heat source 10 to a temperature at which the fat 18 starts to melt and run along the underside of the sausage. The fat 18 builds up to a droplet 20 that falls onto the heat source 10 and ignites. Some of the melted fat 18 runs along the underside of the sausage until it touches the bars 14. The melted fat then builds up around the bars and drips off the underside of the bars as a droplet 22. Here again, the fat 18 ignites or produces smoke. The increased flames due to the burning fat 18 burns, or overcooks, the sausage 16 and produces further flow of fat and juices that fall onto the heat source 10. Before long, the cooking of the sausage 16 and other food on the rack 12 gets out of control.

Figure 2:
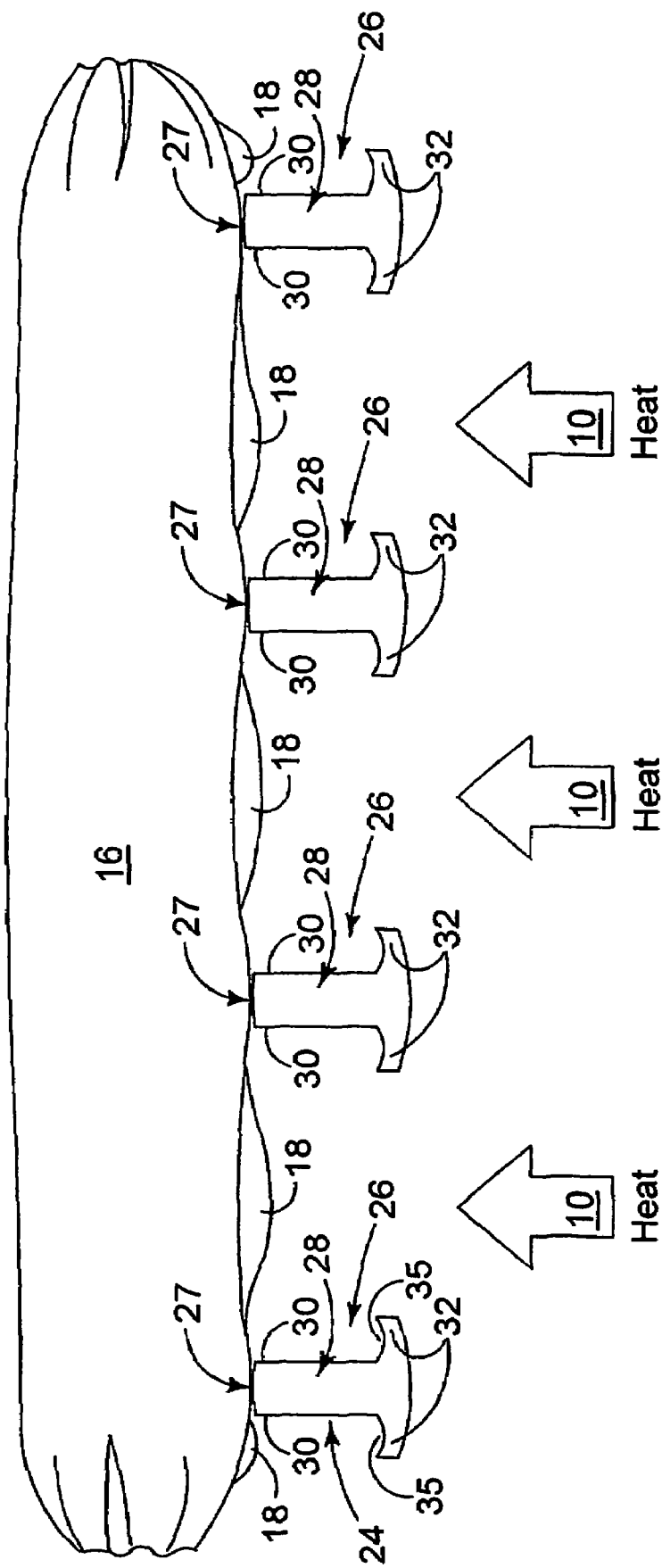
FIGS. 2 and 3 show schematically a cross-sectional view of heating rack members constructed in accordance with one aspect of the present invention, and show the stages of cooking a sausage.
Figure 3:
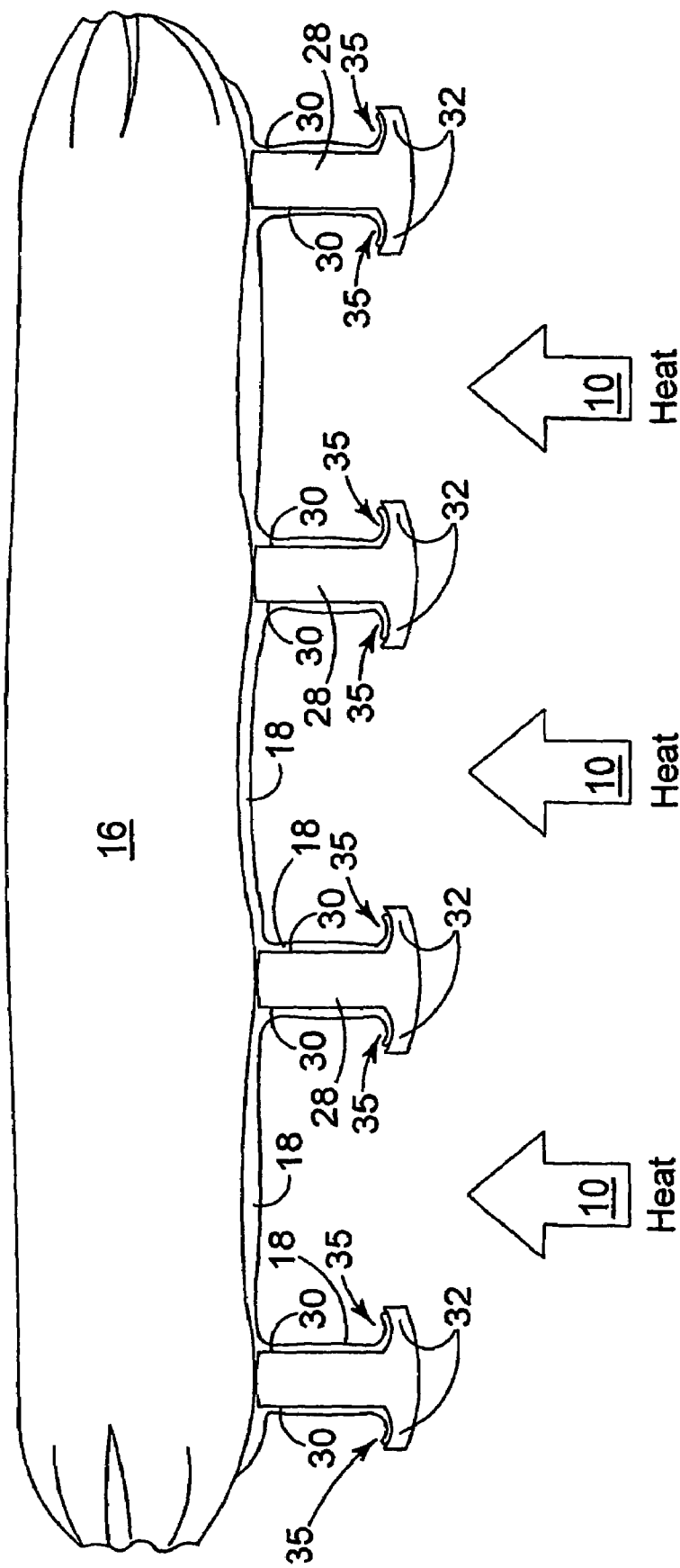

Referring now to FIGS. 2 to 3 there is shown schematically a rack 24 constructed in accordance with one aspect of the present invention which performs the same function as the rack 12 of FIG. 1 and show the stages of cooking a similar sausage 16 to that shown in FIG. 1. However, the rack 24 comprises a plurality of spaced elongate rack members 26 which, in this embodiment, is in the form of metal bars that are constructed in accordance with the present invention.

Each member 26 has a contact surface 27 on which an object to be heated is placed to be exposed to a heat source.

In the first embodiment, each bar 26 is of a generally inverted "T" shaped cross-section. That is to say that each member 26 comprises a central main body 28, having faces 30 that extend along the length of the flange 26 and project in a downwards direction, and side members In the form of lateral portions (or side flanges) 32 adjacent to each side face 30 of the main body 28. It is not necessary for the main body 28 to be vertical, it could be inclined away from a vertical axis providing that the faces 30 of the body 27 extend generally in a downward direction. The lateral portions 32 should define a channel 35 to collect any exudate 18, usually liquid or fat, that flows down the side faces 30 of the main body 28. This will be further appreciated when one considers the stages of heating a sausage 16 as shown in FIGS. 2 to 5.

Thus, there is shown in FIG. 2, a heating rack comprising a plurality of elongate members 26, each elongate member 26 having a contact surface 27 on which an object to be heated is placed to be exposed to a heat source and a first lateral portion 32 shaped to form a channel 35 disposed below the contact surface 27 for receiving and directing exudate from the object to a collection region at one or both ends of the channel. Each elongate member 26 is spaced from an adjacent elongate member 26 to expose the object directly to the heat source when placed at any position along the contact surface 27.

In FIG. 2, the melted fat 18 flows to the bottom of the sausage 16 and starts to run along the underside of the sausage 16. Providing the members 26 are not too far apart, the melted fat will flow along the underside of the sausage until it touches the members 26. In the preferred embodiments the elongate members 26 should be spaced apart about 5 mm to about 15 mm apart, and more preferably, about 12 mm which encourages the fat to flow to the bars by the surface tension effect. It is envisaged that the spacing could be greater, if desired.

As soon as the melted fat 18 touches the side faces 30 of the bars 26 it is induced to run down the faces 30 by the surface tension effect and wet the faces 30. The exudates collects on the upper surfaces of the lateral portions 32 within the channels 35. This is shown in FIG. 3.

Figure 5:
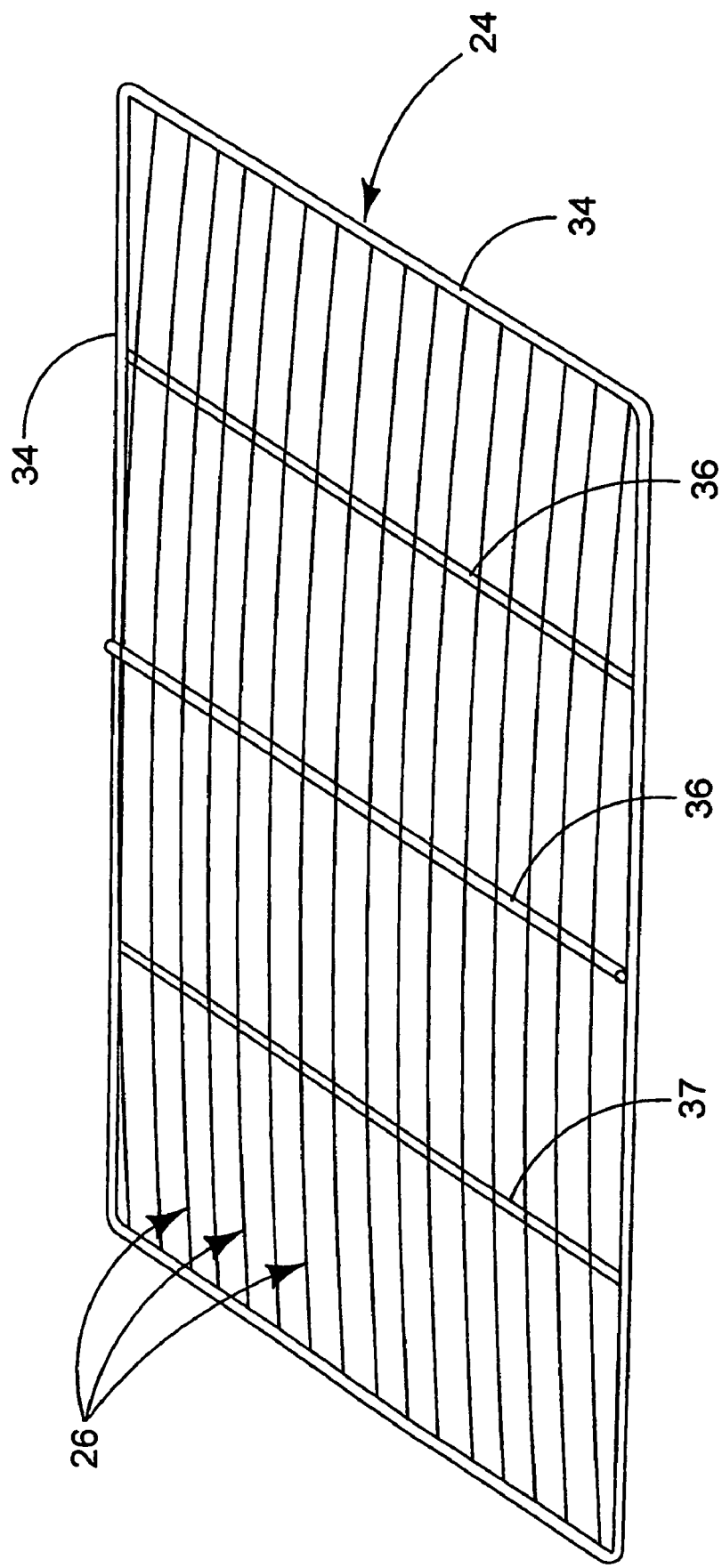
FIG. 5 shows a rack incorporating the rack members of FIGS. 2 and 3.
Figure 6:
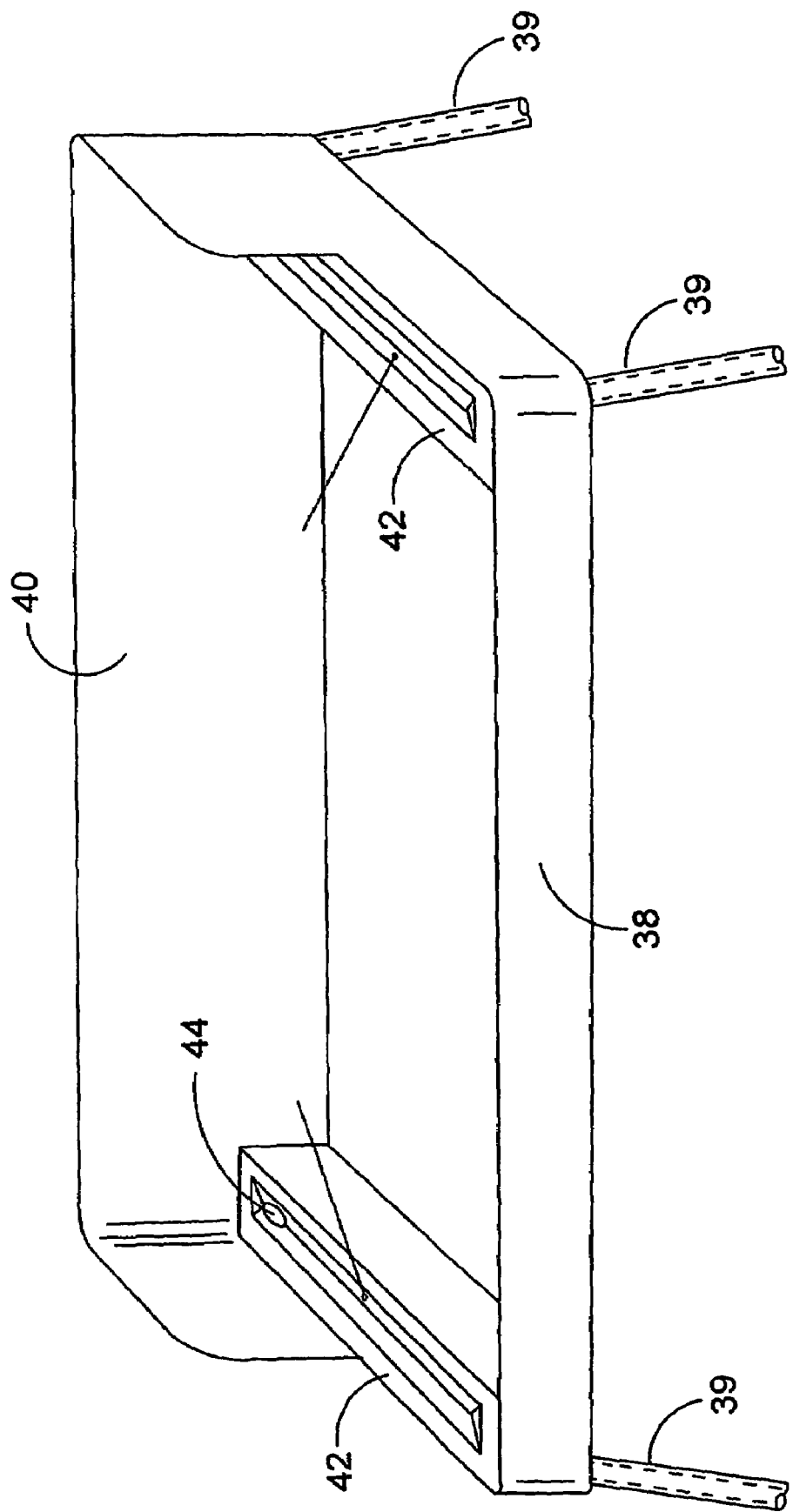
FIG. 6 shows schematically a perspective view of a barbecue tray for use with the rack shown in FIG. 4.

Providing at least the upper surfaces of the lateral portions 32 or the channels 35 are inclined, the melted fat collected in the channels 35 can be directed along the lateral portions 32 towards one or both end of the elongate member 26 to a collection region (shown in FIG. 6). The inclination of the channels 35 can be achieved by inclining each of the members 26 slightly along their length by mounting them on support rods (not shown in FIGS. 2 to 4 but shown in FIG. 5) that extend transverse to the length of the members 26. Alternatively the bars 26 may be made slightly curved as shown in FIG. 5 (being higher at mid span region than at their ends).

The elongate members 26 and support rods can be constructed in a frame and adapted to be fitted or placed on existing heating racks, for example the design shown in FIG. 1.

Figure 4:
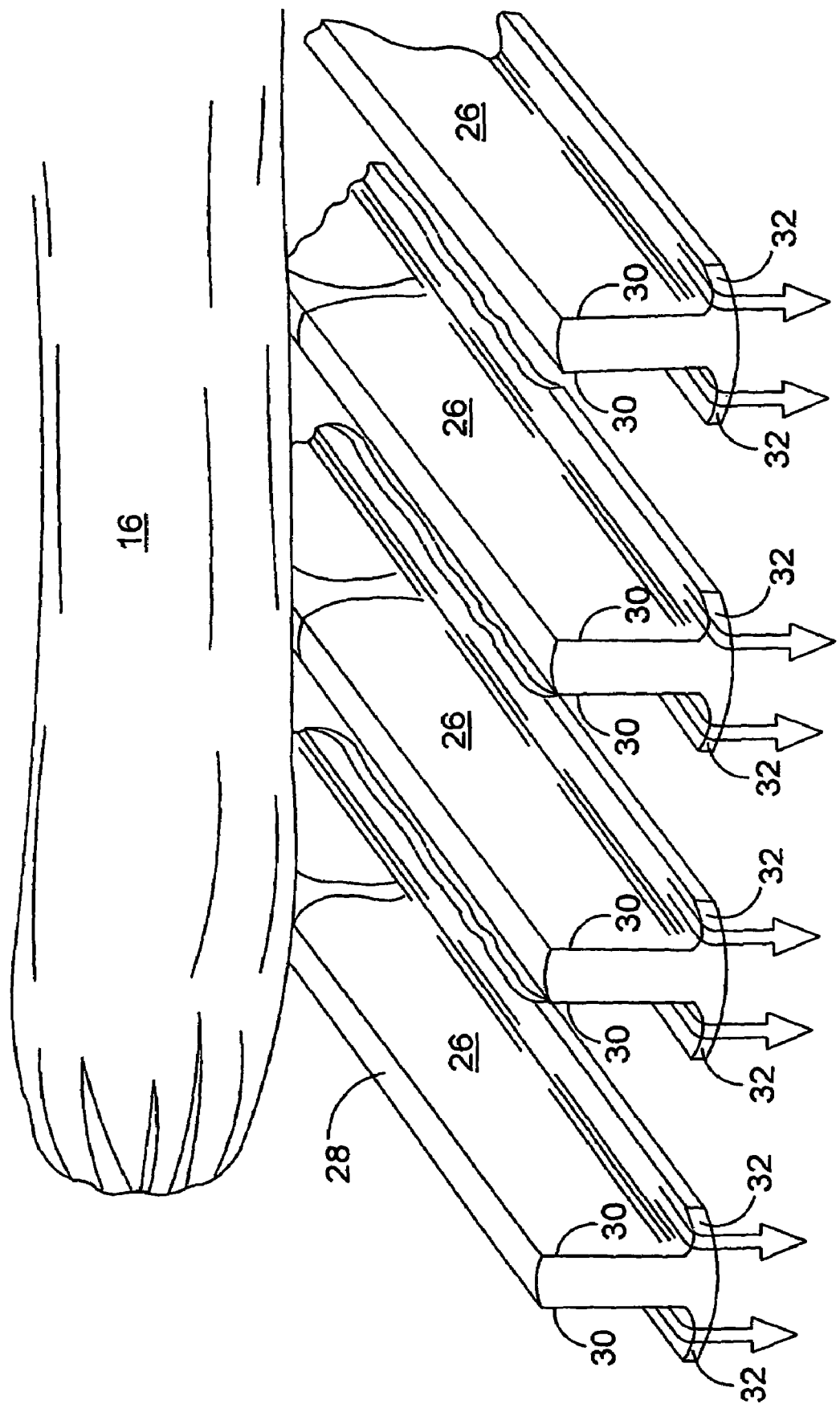
FIG. 4 shows schematically a perspective view of the rack members of FIGS. 2 and 3.

In FIG. 4 the bars 26 are tilted or inclined along their length, and hence the lateral portions 32, are slightly lower at the ends shown on the left of the drawing. Therefore melted fat 18 that runs down the faces 30 by surface tension and collects on the upper surface of the side flanges 28, runs along the length of each bar 26 and is poured into a receptacle located beyond the heat source. This receptacle is not shown in FIGS. 2, 3 and 4 but reference is made here to FIG. 6 where such a receptacle is shown.

In FIG. 5 there is shown one example of a rack 24 where the members 26 are slightly curved, being higher at a mid-span region than at their ends. The members 26 are mounted on a frame 34 that has three support rods 36 extending transverse to the length of the members 26. There may be more or less support rods 36. The members 26 are welded to the frame 34 at each end and rest on top of the rods 36. Clearly the amount of curvature of the bars 26 should not be so great as to cause food (sausages in particular) rolling off the rack 24 to one side. Preferably, a rack 24 which has the bars 26 about 1 to 2 mm higher in the centre of the length of each bar 26 than the ends works well. The orientation of the support boars 36 and elongate members 26 is non-limiting and other options are envisaged without departing from the scope of the invention.

Referring to FIG. 6 there is shown a barbecue tray 38 having four legs 39 and a lid or heat shield 40. Coals, charcoal or gas heated ceramic or synthetic "coal" are placed in the tray 38 and ignited or heated. Although a rectangular tray is shown the tray could be of any shape, such as a circular shape and could have say three legs such as, for example, similar to the common kettle-type barbecues.

The tray 38 of FIG. 6 incorporates two ledges 42 on to which the rack 24 of FIG. 6 is rested. Each ledge 42 has a recess 43 which is in the shape of a "V" shaped trench. The rack 24 is positioned so that the ends of the bars 26 terminate above the respective recess 43. In this way, molten fat 18 collected on the upper surfaces of the side flanges 32 of the bars 26 flows in a direction along the length of the bars 26 in two directions and is collected in the respective recess 43. If desired, each recess 43 may slope towards the rear of the tray. Furthermore an aperture 44 could be provided in the bottom of each recess 43 so that melted fat runs out of the recess 43 through the aperture 44. A container (not shown) may be positioned under the hole 44 to catch the molten fat 18.

In the embodiment shown in FIGS. 2 to 5 the lateral portions 32 formed on each side of main body 28 are slightly curved upwards to define the channels 35. If desired the lateral portions 32 of each member 26 may be formed so that they project slightly upwards relative to the main body 28 and define a shallow "V" shaped trough running along the upper surface of the lateral portions 32. This is shown in FIG. 7. Alternatively the lateral portions 32 may take the form of a side flange 32 which is relatively flat with a lip 46 running along the longitudinal extremity of the flanges. This is shown in FIG. 8.

The members 26 of FIGS. 2 to 8 are preferably made as metal bars formed by extruding or pultruding them. However the members 26 could be made by folding thin metal sheets as shown in FIGS. 9 to 10 to define the main body 28 and side members 32. These embodiments define channels 35 that are similar to the embodiments of FIGS. 1 and 3.

In particular, in FIGS. 9 to 11, the main bodies 28 comprise a thin metal sheet folded with the side faces 30 projecting downwards to define equivalent structure to that of the lateral portion 28. In FIG. 9 the sheet is folded along two lines 48 to form side flanges 32 that project slightly upwards. In FIG. 10 the sheet is folded about two lines 48 to form the side flanges 32 and then folded about two lines 49 to form angled lips 46 at the free ends of the side flanges 32.

Referring to FIG. 11 there is shown an insert that can be retrofitted to racks of the type shown in FIG. 1 to make full use of the present invention.

Referring to FIG. 11 the insert is in the form of a thin metal sheet 45 folded along an axis so as to wrap around a circular cross-section bar 14. The sheet 45 is folded so that it has a main body 28 having two faces 30 that project downwards and fulfill the same purpose as the faces 30 of FIGS. 2 to 10. The sheet 45 is folded about two lines 49 to form side flanges 32 that extend slightly upwards. The lateral portions (or flanges) 32 perform the same function as those of FIGS. 2 to 10. To secure the sheet 45 in place on the bars 16 small tangs 47 projecting upwards are pressed out of the side faces to engage the underside of the bars 16. In this way the sheet 45 can be pressed on to the bars 16. In so far as the present invention is concerned the combination of the known circular cross-section bars 16 (or any other cross-sectional shape for that matter) and the insert 45 shown in FIG. 11 are the equivalent of the members 26 of FIGS. 1 to 10. In order that existing racks can be modified in this way it would be preferable to provide a receptacle at one or both ends of the insert to catch the melted fat.

A receptacle to collect the fat from the side members could be a separate item or could be clipped to the members 26 or the support rods 36 and/or inserts 45 of FIGS. 2 to 11.

In FIG. 12, there is shown a further embodiment of elongate member 26 which is "anchor" shaped. The lateral portions (or side flanges) 32 are curved upwards to define a deep channel 35 on each side of the main body 28 to define a "U" shaped trough running along the upper surface of the side flanges 32.

Figure 13:
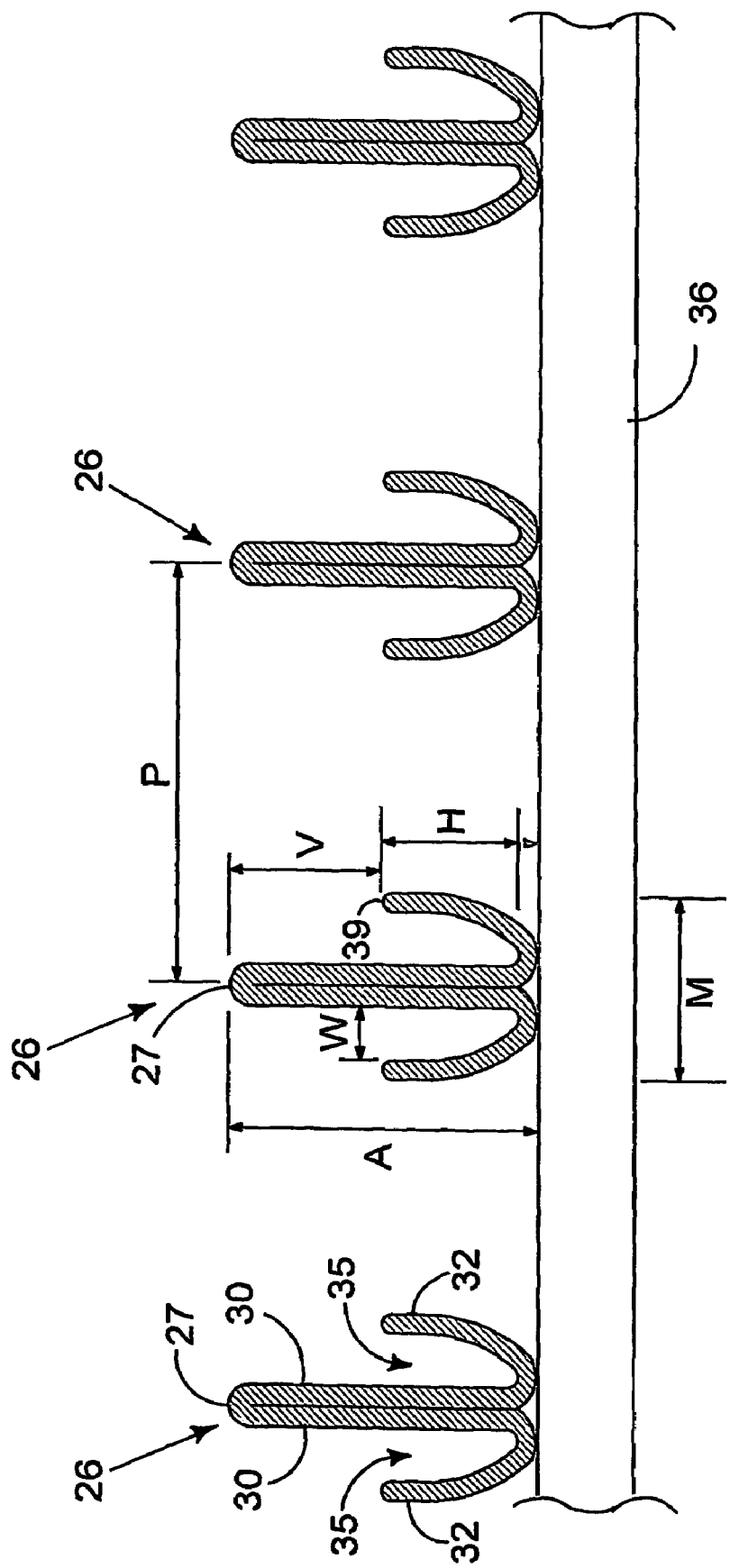
FIG. 13 illustrates a plurality of rack members of the preferred embodiment shown in FIG. 12, mounted to a support rod.

In FIG. 13, there is shown a plurality of elongate members corresponding to the embodiment shown in FIG. 12 mounted on one or more support rods 36. In order to encourage flow of exudate from the object being heated, by using surface tension effect, the preferred pitch P (or spacing) between adjacent elongate members is between about 5 mm and 15 mm, and most preferably about 12 mm. In order to encourage the exudate to flow into the channel 35, the preferred vertical height V between the contact surface 27 and the proximal end 39 of the lateral portion 32 is about 1 mm or more.

The preferred dimensions of the channel 35 are a width of at least 0.5 mm (and preferably around 1 mm) and a height H of at least 1 mm (and preferably about 2.5 mm), in order to reduce the risk of the channel being breached.

In some embodiments, the vertical height A of the main body 28 is in the range of 5 mm to 10 mm and the width M of the elongate member 26 is in the range of 2 mm to 6 mm.

The aforementioned dimensions are provided by way of example only to aid understanding of one preferred embodiment. Of course, these dimensions can be changed without departing from the scope of the invention.

It will be appreciated from the above that whilst the embodiments, illustrate opposed lateral portions, it is envisaged that the elongate member 26 can comprise a single lateral portion 32 defining a single channel 35, without departing from the scope of invention. In some embodiments, the lateral portions 32 may be symmetrical relative to the main body 28 or asymmetrical. Furthermore, if the main body 28 is inclined to the vertical, the lateral portions 32 should preferably extend in a horizontal direction sufficient to collect any fat runs down the side faces 30. However, in order not to impede the cooking of food placed on the bars 26 and to increase exposure of the food to as much direct heating as possible, the lateral portions 32 should not extend to such an extent that they project under adjacent bars 26 or block off direct heating from the heat source below the food. Ideally radiated heat from the heat source 10 should have a direct vertical path to the food on the bars.

It is to be understood that the members 26 and inserts 45 may be made of steel or cast iron. If desired they may be chromium plated or coated with polyletrafluroethylene (PTFE) or enamelled so as to provide a non-stick surface at least on surfaces 30 and the upper surfaces of the side members.

It will be appreciated that although the heating rack has been described for use in barbecues and the like, it may be used under grills or in ovens and microwave ovens where the heat source is not necessarily confined to beneath the rack.

From the foregoing it will be appreciated that by exploiting the surface tension effect and inducing the fat to wet and run down the surfaces 30 the spacing between the members 28 can be opened up and this helps to increase the amount of exposure of the food item to radiated and convective heat from below without fear of excessive dripping of fat on to the heat source. This has the advantage of improving the quality and flavour of the cooked food.

The invention claimed is:

1. A heating rack, comprising:
    a plurality of elongate members, each elongate member having a contact surface on which an object to be heated is placed to be exposed to a heat source and a first lateral portion shaped to form a channel disposed below the contact surface for receiving and directing exudate from the object to a collection region at one or both ends of the channel, wherein each elongate member is spaced from an adjacent elongate member to expose the object directly to the heat source when placed at any position along the contact surface,
    each elongate member has a side face extending between the contact surface and the first lateral portion to encourage exudate from the object to flow from the contact surface to the channel positioned on one side of the contact surface, and each elongate member has a second side face extending between the contact surface and a second lateral portion to form a second channel on the opposing side of the contact surface.

2. A heating rack as claimed in claim 1, wherein each elongate member is spaced from an adjacent elongate member by a distance in the range of 5 mm to around 15 mm, thereby to induce flow of exudates by surface tension effect.

3. A heat rack as claimed in claim 2, wherein the vertical distance between the contact surface and the proximal end of the lateral portion is about 1 mm or more, thereby to encourage flow of exudates into the channel by a surface tension effect.

4. A heat rack as claimed in claim 1, wherein the vertical distance between the contact surface and the proximal end of the lateral portion is about 1 mm or more, thereby to encourage flow of exudates into the channel by a surface tension effect.

5. A heating rack according to claim 1, wherein the lateral portions are inclined along their length so that liquid collected by the channels is directed along the side members to a collection region at one or both ends of the side members.

6. A heating rack according to claim 5, wherein the lateral portions are inclined in two directions along their length.

7. A heating rack according to claim 1, wherein the elongate members are inclined along their length so that the liquid collected by the channels is directed in a direction along the channels no a collection region at one or both cods of the main members.

8. A heating rack according to claim 7 wherein the elongate members are inclined in two directions along their length.

9. A heating rack according to claim 7, wherein the elongate members are curved along their length being higher at a mid-span region than at their ends.

10. A heating rack according to claim 1, who rein the elongate members are formed from a sheet of metal that is folded to define the main body with two side faces and the lateral portion (s).

11. A heating rack according to claim 1, wherein the width of the or each channel is at least 0.5 mm and the vertical height of the or each channel is at least 1 mm.

12. A heating rack according to claim 1, wherein the elongate members are mounted on support rods.

13. A heating rack according to claim 12, wherein the support rods define a frame with rods extending across the frame transverse to the members.

14. A heating rack according to claim 13, wherein the receptacle is suspended or attached to the elongate members.

15. A heating rack according to claim 1, wherein each elongate member comprises a sheet of metal that is folded into a shape that fits over a rod and defines the or each lateral portion and the contact surface.

16. A heating rack according to claim 1, wherein a receptacle is provided to collect fluids from the channels.

17. A barbecue heating device incorporating a rack constructed in accordance with claim 1.

18. A heating rack, comprising:
   a plurality of elongate members, each elongate member having a contact surface on which an object to be heated is placed to be exposed to a heat source and a first lateral portion shaped to form a channel disposed below the contact surface for receiving and directing exudate from the object to a collection region at one or both ends of the channel, wherein each elongate member is spaced from an adjacent elongate member to expose the object directly to the heat source when placed at any position along the contact surface,
   wherein the elongate members are of substantially inverted "T" shape cross-section, or "anchor" shape in cross-section.

* * * * *